Jan. 5, 1954 G. M. TOMPKINS 2,665,138
RETRACTABLE ROAD WHEEL ASSEMBLY FOR VEHICLE TRAILERS
Filed June 12, 1952

Patented Jan. 5, 1954

2,665,138

UNITED STATES PATENT OFFICE 2,665,138

RETRACTABLE ROAD WHEEL ASSEMBLY FOR VEHICLE TRAILERS

George Maxwell Tompkins, Parktown West, Johannesburg, Union of South Africa

Application June 12, 1952, Serial No. 293,106

5 Claims. (Cl. 280—41)

This invention relates to road vehicles in the form of trailers, and in particular to trailers which are required to be transported, without unloading, by both road and rail.

Road vehicles are frequently too lofty to be loaded onto a railway wagon for transport although it would often be desirable to rail a loaded road vehicle, such as a trailer, transport it to the railway for movement by rail and at the end of the railway journey to move it again by road, without unloading, to its final destination. The object of this invention is to provide a trailer which can be moved on road and rail without unloading and yet will be low enough to afford ample head room without loss of capacity when conveyed by rail.

According to this invention there is provided a road vehicle comprising a trailer having retractable road wheels mounted to swing from a position where they project below the vehicle to a position where they project from the ends thereof. The retractable road wheels are conveniently mounted on semi-elliptical springs, the inner ends of said springs being provided with horizontal slides while their outer ends are attached to swinging straps by which the wheels are carried either in their running position or in a retracted position. The trailer is, by this provision, capable of being reduced in height to normal loading, and when loaded on a railway wagon is reduced in height to provide head room. Again when the trailer is fitted with a double deck the invention provides for its upper deck to be lowered substantially to ramp level for ease of loading.

Furthermore, the retracted wheels may be mounted so as to form buffers and wedging members for the body of the vehicle when carried on a railway wagon.

This invention is applicable both to the type of trailer which normally is transported on four wheels and also to the trailer which has its front end adapted to be carried on the rear of a tractor, or on a wheeled dolly or bogie which can easily be removed in the well known manner.

The four wheel type is illustrated somewhat schematically in the accompanying drawings, in which in all figures the road wheels are shown by dotted lines—

Figure 1:
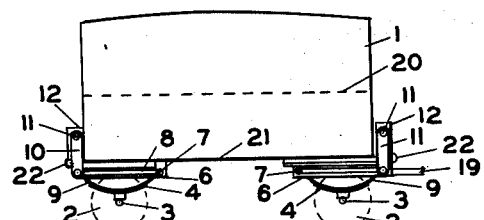
Fig. 1 is a side view of the vehicle ready for travelling on the road.

In the drawings there is illustrated a body 1 of a vehicle, such as a pantechnicon, mounted on road wheels 2, shown in dotted lines. The axles 3 are shown as carried on semi-elliptical springs 4.

Figure 2:
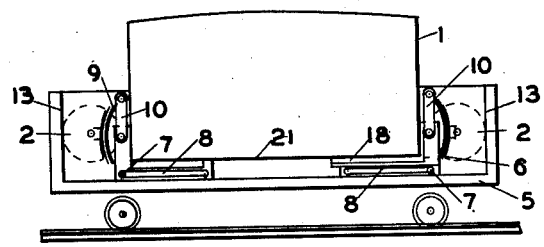
Fig. 2 shows a view of the vehicle mounted in a railway wagon.

The vehicle shown in Fig. 1 is again shown in Fig. 2, but mounted on a railway wagon 5. In this latter view the wheels 2 have been swung to the rear and upwardly and in this way the total height of the body 1 on the wagon 5 is sufficiently low to clear the head room allowed by the railway.

To allow the wheels 2 to be swung from the position shown in Fig. 1 to the position shown in Fig. 2 the inside ends 6 of the semi-elliptical springs 4 are each carried in a slipper 7 adapted to be moved in a slide 8 which is secured to the chassis below the floor of the trailer. The other ends 9 of the springs 4 are hung from the ends of straps 10 which are rotatably suspended from the pins 11 mounted in a bracket 12 secured to the body 1. It will be understood that while only one side of the vehicle is described and shown the parts are duplicated on the opposite side and pins 11 will be carried through from one side of the vehicle to the other. Also the slippers 7 at each end of the vehicle are connected together by rods passing between them and tying the ends of the springs 4 on the one end of the vehicle together.

Figure 4:
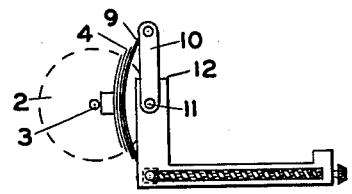

By swinging the straps 10 about the pins 11 the slippers 7 are moved along the slide 8 to take up the position shown in Figs. 2 and 4. In this position the body 1 is no longer supported on the road wheels 2, but the wheels project from both ends of the body 1.

In swinging the wheels 2 from the position shown in Fig. 1 to that shown in Fig. 2, the body 1 has been lowered so that it rests on the floor of the railway wagon 5. During such lowering, said wheels 2 swing about the ends of the body 1 and in such movement they are moved out beyond the end of the body 1 and then back to rest against it. From such a position they may be returned slightly towards their road running position which will operate to move them outwards to jam them against the ends 13 of the wagon 5 or other fixtures and so act as buffers and to clamp the body 1 fast by the resilient cushioning of the tyres of the wheels 5.

Figure 3:
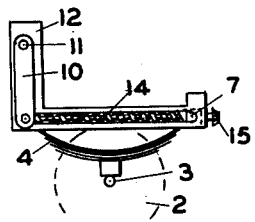
Figs. 3 and 4 are views of part of the vehicle on an enlarged scale showing one method of moving the road wheels from their running to their lowered position.

To effect the desired movement of springs 4 to carry the wheels 2 from their running and their resting positions any suitable mechanism may be employed. In Figs. 3 and 4, the slipper 7 is shown as a nut threaded on a screwed rod 14 adapted to be rotated through a bevel wheel 15. When the rod 14 is rotated so that the slipper 7 is screwed to the inside end thereof the semi-elliptical spring 4 is held so as to carry axle 3 and wheels 2 in their running position and when the rod 14 is rotated in the opposite direction, to screw the slipper 7 to the outside end of rod 14, the wheels 2 are fully retracted as shown in Fig. 4.

Figure 5:
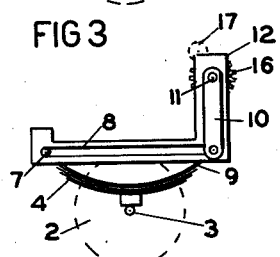
Fig. 5 shows an alternative construction to that in Figs. 3 and 4.

Fig. 5 indicates another method of swinging the wheels 2 from one position to the other. In this method the pin 11 is secured to the straps 10 to be rotatable therewith. Gear wheel 16 is keyed to pin 11 and the pinion 17 is shown as meshing therewith. On the rotation of gear 17, the ends 9 of the straps 10 are swung outwardly drawing with them the ends of the springs 4 and moving shoes 7 along the slides 8.

Figure 6:
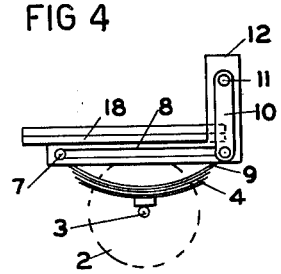
Fig. 6 shows the wheels mounted on turning rings.
Figure 7:
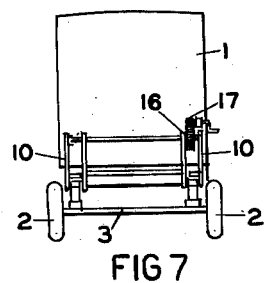
Fig. 7 is an end view of the embodiment of Fig. 5 but to half the scale.

Figs. 1 and 6 show the slide 8 furnished with turning rings 18 to enable the front wheels of the truck to swivel. 19 indicates a draw bar.

It will be noted that if the wheels 2 are in the position shown in Fig. 2 with the body 1 resting on the ground instead of the railway wagon as illustrated, it can easily be loaded without the necessity of lifting the load to the normal floor height of the vehicle.

As an example of a further use for this trailer it may be used for the transport of livestock and in particular sheep or pigs which are accommodated on a double deck trailer.

Fig. 1 shows in dotted lines 20 the position of the second deck. For loading, for instance, sheep from a ramp, the trailer, backed up to the ramp, can have its normal floor 21 easily loaded and if it is provided with an upper floor or deck 20 the trailer is now lowered so that its normal floor 21 is at about ground level and the upper floor 20 is on a level or nearly on a level with the loading ramp and can be loaded easily therefrom. Having been loaded on both floors 20 and 21 the trailer is raised by having its wheels 2 swung into place when it can be transported by road or wheeled onto a railway wagon 5. On the wagon it is again lowered to the floor of the same so that it provides head room clearance. The off-loading is accomplished by a reverse of the loading method.

When the wheels 2 are brought to their carrying or running position they may be locked against retraction in any convenient manner. In the embodiment shown in Figs. 3 and 4, no special locking device is required. In the embodiment shown in Figs. 1 and 2 a removable pin 22 may be provided which is inserted in the brackets 12 to prevent the outward swing of strap 10.

When the body 1 is heavily loaded the lowering and raising of it may be assisted by the use of suitable jacks, not shown.

This invention provides a trailer which can be lowered by swinging its wheels away from their carrying and running position, while at the same time allowing their withdrawal and repositioning to be accomplished easily and without the necessity for a special crane or other lifting device other than the usual vehicle jack.

What I claim as new and desire to secure by Letters Patent is:

1. A road vehicle comprising a trailer, a floor and end walls for the trailer, wheels mounted on semi-elliptical springs, slides below the floor of the trailer, a slipper in each slide and attached to one end of the spring, a strap pivoted on the end wall of the trailer and attached to the other end of the spring, and means for swinging the strap through approximately 180°.

2. A road vehicle as claimed in claim 1 having a threaded nut on the slipper and a screwed rod extending along the length of the slide and engaging said nut.

3. A road vehicle comprising a trailer, a floor and end walls for the trailer, a pair of road wheels mounted on a common axle, a pair of semi-elliptical springs for each axle, a slipper for one end of each spring, a slide on the underside of the floor of the trailer for each slipper, a strap with one end attached to the other end of each spring, a common rod attached to the other ends of the straps, a support on the end of the trailer for the rod, and means for rotating said rod with the straps attached thereto through 180°.

4. A road vehicle as claimed in claim 3 having gearing for rotating the rod attached to the straps.

5. A road vehicle comprising a trailer, a floor and end walls for the trailer, two pairs of road wheels each pair mounted on a common axle, a pair of semi-elliptical springs for each axle, a slipper for one end of each spring, a slide on the underside of the floor of the trailer for each slipper, a strap with one end attached to the other end of each spring, a common rod attached to the other ends of each pair of straps, a support on the end of the trailer for the rod, and means for rotating said rod with the straps attached thereto through 180°.

GEORGE MAXWELL TOMPKINS.

References Cited in the file of this patent

UNITED STATES PATENTS

| Number | Name | Date |
| --- | --- | --- |
| 2,050,471 | Soulis | Aug. 11, 1936 |
| 2,313,877 | Joyce | Mar. 16, 1943 |
| 2,518,602 | Crook | Aug. 15, 1950 |

FOREIGN PATENTS

| Number | Country | Date |
| --- | --- | --- |
| 766,917 | France | Apr. 23, 1934 |